United States Patent
Andrianov et al.

(10) Patent No.: US 11,570,044 B2
(45) Date of Patent: Jan. 31, 2023

(54) CONFLICT RESOLUTION IN NETWORK VIRTUALIZATION SCENARIOS

(71) Applicant: NOKIA SOLUTIONS AND NETWORKS OY, Espoo (FI)

(72) Inventors: Anatoly Andrianov, Schaumburg, IL (US); Gyula Bodog, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 46 days.

(21) Appl. No.: 16/085,104

(22) PCT Filed: Mar. 6, 2017

(86) PCT No.: PCT/EP2017/055174
§ 371 (c)(1),
(2) Date: Sep. 14, 2018

(87) PCT Pub. No.: WO2017/157708
PCT Pub. Date: Sep. 21, 2017

(65) Prior Publication Data
US 2019/0109762 A1 Apr. 11, 2019

Related U.S. Application Data

(60) Provisional application No. 62/308,561, filed on Mar. 15, 2016.

(51) Int. Cl.
*H04L 41/0813* (2022.01)
*G06F 9/50* (2006.01)
*G06F 9/455* (2018.01)

(52) U.S. Cl.
CPC ...... *H04L 41/0813* (2013.01); *G06F 9/45558* (2013.01); *G06F 9/5077* (2013.01); *G06F 2009/45595* (2013.01)

(58) Field of Classification Search
CPC . H04L 41/0813; G06F 9/5558; G06F 9/5077; G06F 2009/45595
See application file for complete search history.

(56) References Cited

U.S. PATENT DOCUMENTS 9,647,889 B1 * 5/2017 Jones .................. H04L 41/0816
11,165,829 B2 * 11/2021 Kalliola .............. H04L 63/0272
(Continued)

FOREIGN PATENT DOCUMENTS

JP         2019075802 A  *  5/2019  ......... G06F 9/45558
WO    WO-2015131696 A1 *  9/2015  ........... H04L 41/044

OTHER PUBLICATIONS

R. Mijumbi, J. Serrat, J.-I. Gorricho, S. Latre, M. Charalambides and D. Lopez, "Management and orchestration challenges in network functions virtualization," in IEEE Communications Magazine, vol. 54, No. 1, pp. 98-105, Jan. 2016, doi: 10.1109/MCOM.2016. 7378433. (Year: 2016).*

(Continued)

*Primary Examiner* — Uzma Alam
(74) *Attorney, Agent, or Firm* — Squire Patton Boggs (US) LLP (57) ABSTRACT

There are provided measures for conflict resolution in a network virtualization scenario, wherein a virtualized network function is utilized by a first virtualized network service managed by a first network component and a second virtualized network service managed by a second network component. The measures comprise requesting, by the first network component, an alteration of the virtualized network function, transmitting information indicative of the alteration of the virtualized network function to the second network component, and determining when the alteration of the virtualized network function impacts the second virtualized network service.

8 Claims, 6 Drawing Sheets

(56) References Cited

U.S. PATENT DOCUMENTS

| | | | |
|---|---|---|---|
| 2015/0180722 A1* | 6/2015 | Kapadia | H04L 12/4625 370/401 |
| 2015/0381423 A1* | 12/2015 | Xiang | H04L 41/0895 709/223 |
| 2016/0212012 A1* | 7/2016 | Young | G06F 9/00 |
| 2017/0063714 A1* | 3/2017 | Xiang | H04L 41/5058 |
| 2018/0048523 A1* | 2/2018 | Nakano | H04L 41/0873 |
| 2018/0115485 A1* | 4/2018 | Chiba | H04L 45/74 |
| 2018/0165084 A1* | 6/2018 | Mahimkar | G06F 8/65 |
| 2018/0206108 A1* | 7/2018 | Chou | H04W 28/0842 |
| 2019/0199760 A1* | 6/2019 | Arauz-Rosado | H04L 61/5007 |
| 2021/0200599 A1* | 7/2021 | Segura Cava | G06F 9/5077 |

OTHER PUBLICATIONS

May 18, 2017 International Search Report and Written Opinion issued in International Patent Application No. PCT/EP2017/055174.

Ghaznavi, Miland et al., "Elastic virtual network function placement", 2015 IEEE 4th International Conference On Cloud Networking (Cloudnet), IEEE, Oct. 5, 2015, pp. 255-260.

Zhiming, Shen et al., "Cloudscale: Elastic Resource Scaling for Multi-Tenant Cloud Systems", Cloud Computing, ACM, 2 Penn Plaza, Suite 701 New York, NY 10121-0701, USA, Oct. 26, 2011, pp. 1-14.

Makaya, Christian et al., "Policy-based NFV management and orchestration", 2015 IEEE Conference on Network Function Virtualization and Software Defined Network (NFV-SDN), IEEE, Nov. 18, 2015, pp. 128-134.

Tang, Pengcheng et al., "Efficient Auto-Scaling Approach in the Telco Cloud Using Self-Learning Algorithm", 2015 IEEE Global Communications Conference (GlobeCom), IEEE, Dec. 6, 2015, pp. 1-6.

European invitation to oral proceedings pursuant to Rule 115(1) EPC, corresponding to EP Application No. 17 708 805.1, dated Feb. 26, 2021.

Jason Hung et al., "End-to-End Network Service Lifecycle Demonstration", 2015 IEEE Conference on Network Function Virtualization and Software Defined Network (NFV-SDN), Nov. 18, 2015, XP032852456, pp. 9-12.

Chinese Office Action with English language summary corresponding the CN Application No. 201780030053.X, dated Jul. 5, 2021.

Indian Office Action corresponding to IN Application No. 201817032712, dated Aug. 20, 2020.

* cited by examiner

CONFLICT RESOLUTION IN NETWORK VIRTUALIZATION SCENARIOS

FIELD

The present invention relates to conflict resolution in network virtualization scenarios. More specifically, the present invention exemplarily relates to measures (including methods, apparatuses and computer program products) for resolving potential conflicts regarding usage and alteration of virtualized network functions in such scenarios.

BACKGROUND

The present specification generally relates to network functions virtualization (NFV).

In NFV, virtualized network functions (VNF) are software implementations of network functions that can be deployed on a network functions virtualization infrastructure (NFVI).

NFVI is the totality of all hardware and software components that build the environment where VNFs are deployed and can span several locations.

Each VNF is managed by a VNF manager (VNFM). A VNFM may for example determine specific resources needed by a certain VNF when a VNF is instantiated (i.e. built) or altered.

The so-called NFV orchestrator (NFVO) is responsible for network service management. A network service is a composition of network functions and defined by its functional and behavioral specification.

The NFVO is an entity that has the overview of the available, actually used and reserved resources in a multi-VNF environment and is also responsible for decisions about resource allocation and placement. The NFVO's tasks include lifecycle management (including instantiation, scale-out/in, performance measurements, event correlation, termination) of virtualized network services. Further, the actual responsibility on where VNFs or their components are placed in the NFVI is with the NFVO.

Accordingly, according to present approaches, two architectural building blocks cooperate for resource allocation for VNFs, namely the VNFM and the NFVO.

In virtualized network scenarios certain types of VNFs may also be shared between virtualized network services. A virtualized network service can be seen as a virtualized coherent logical network part and may be, for example, a virtualized IP (internet protocol) multimedia subsystem (vIMS) or a virtualized evolved packet core (vEPC).

An IMS is an architectural framework for delivering IP multimedia services, whereas an EPC is part of the network architecture of 3GPP's LTE (and further) wireless communication standards. Subcomponents of the EPC can be: MME (Mobility Management Entity), SGW (Serving Gateway), PGW (PDN—Packet Data Network—Gateway), HSS (Home Subscriber Server), ANDSF (Access Network Discovery and Selection Function) and ePDG (Evolved Packet Data Gateway).

A shared VNF may, for example, be a virtualized home subscriber server. In other words, one virtualized HSS may be an instance of a vIMS as well as of a vEPC.

The HSS is defined as a central database that contains user-related and subscription-related information. The functions of the HSS include functionalities such as mobility management, call and session establishment support, user authentication and access authorization. Thus, one virtualized HSS may need to be in connection to a first network service like a vIMS as well as to a second network service like a vEPC.

For lifecycle management initiated by an NFVO problems may arise when VNFs shared between multiple network services are involved. In suchlike cases conflict may appear.

For example, when an NFVO decides, as part of an update to a first network service, to initiate a VNF LCM (Life Cycle Management) operation for a shared VNF, this may also affect further network services.

The result of a scale VNF operation aimed to optimize one network service, may cause undesired consequences in further network services. For example: A first network service may be in a good or healthy situation. But when a second network service may request a scale-in operation (for a VNF that is indeed a shared VNF), this may result in a congestion or overload situation for the (so far) healthy first network service.

Hence, there is a need to provide for conflict resolution in network virtualization scenarios, in particular for virtual network functions shared in multiple virtualized network services.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method in a network virtualization scenario, where a virtualized network function is utilized by a first virtualized network service managed by a first network component and a second virtualized network service managed by a second network component, comprising requesting, by the first network component, an alteration of the virtualized network function, transmitting information indicative of the alteration of the virtualized network function to the second network component (NFVO2), and determining when the alteration of the virtualized network function impacts the second virtualized network service.

According to an exemplary aspect of the present invention, there is provided a system comprising a first network component, a first network function managed by the first network component, a second network component, a second network function managed by the second network component, and a virtualized network function utilized by the first virtualized network service and the second virtualized network service, wherein said first network component is configured to request an alteration of the virtualized network function, and said system is configured to transmit information indicative of the alteration of the virtualized network function to the second network component, and to determine when the alteration of the virtualized network function impacts the second virtualized network service.

According to an exemplary aspect of the present invention, there is provided an apparatus in a network virtualization scenario, comprising managing means for managing a virtualized network service utilizing a virtualized network function, requesting means for requesting an alteration of the virtualized network function, and transmitting means for transmitting information indicative of the alteration of the virtualized network function to a further apparatus managing a further virtualized network service utilizing the virtualized network function.

According to an exemplary aspect of the present invention, there is provided an apparatus in a network virtualization scenario, comprising managing means for managing a virtualized network service utilizing a virtualized network function, receiving means for receiving information indicative of a planned alteration of the virtualized network function from a further apparatus managing a further virtualized network service utilizing the virtualized network function, determining means for determining when the alteration of the virtualized network function impacts the virtualized network service, and at least one of the following: approving means for approving the alteration of the virtualized network function as function of the determining when the alteration of the virtualized network function impacts the virtualized network service, rejecting means for rejecting the alteration of the virtualized network function as function of the determining when the alteration of the virtualized network function impacts the virtualized network service, and offering means for offering an alternative alteration of the virtualized network function as function of the determining when the alteration of the virtualized network function impacts the virtualized network service.

According to an exemplary aspect of the present invention, there is provided an apparatus in a network virtualization scenario, comprising at least one processor, at least one memory including computer program code, and at least one interface configured for communication with at least another apparatus, the at least one processor, with the at least one memory and the computer program code, being configured to cause the apparatus to perform: managing a virtualized network service utilizing a virtualized network function, requesting an alteration of the virtualized network function, and transmitting information indicative of the alteration of the virtualized network function to a further apparatus managing a further virtualized network service utilizing the virtualized network function.

According to an exemplary aspect of the present invention, there is provided an apparatus in a network virtualization scenario, comprising at least one processor, at least one memory including computer program code, and at least one interface configured for communication with at least another apparatus, the at least one processor, with the at least one memory and the computer program code, being configured to cause the apparatus to perform: managing a virtualized network service utilizing a virtualized network function, receiving information indicative of a planned alteration of the virtualized network function from a further apparatus managing a further virtualized network service utilizing the virtualized network function, determining when the alteration of the virtualized network function impacts the virtualized network service, and at least one of the following: approving the alteration of the virtualized network function as function of the determining when the alteration of the virtualized network function impacts the virtualized network service, rejecting the alteration of the virtualized network function as function of the determining when the alteration of the virtualized network function impacts the virtualized network service, offering an alternative alteration of the virtualized network function as function of the determining when the alteration of the virtualized network function impacts the virtualized network service.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables at least one of the following:

In cases where a VNF instance is shared between multiple (virtualized) network services the result of an alteration (e.g. scale operation) of the VNF will not cause negative interferences in-between the network services.

There are certain types of VNFs that may be shared between (virtualized) network services. An example for a (potentially) shared VNF can be a virtualized HSS. In this case, only one instance of a virtualized HSS is instantiated and this VNF instance is then shared among multiple (instances of) (virtualized) network services (e.g. between an instance of vIMS and an instance of vEPC network services). When a scale operation is initiated by a first virtualized network service (or, rather, by its management entity), this alteration of the shared VNF will also affect all further virtualized network services using said shared VNF. With the help of the present invention negative (or all) impacts can be avoided.

Thus, any one of the above aspects thereby solves at least part of the problems and drawbacks identified in relation to the prior art.

By way of exemplary embodiments of the present invention, there is provided conflict resolution in network virtualization scenarios. More specifically, by way of exemplary embodiments of the present invention, there are provided measures and mechanisms for avoiding conflicts in network virtualization scenarios, and in particular when VNFs are shared. In other words, by way of exemplary embodiments of the present invention, there are provided measures and mechanisms for realizing cooperation and avoiding negative influences between (virtualized) network entities, as discussed in more detail below.

Thus, improvement is achieved by methods, apparatuses and computer program products enabling/realizing resource placement control in network virtualization scenarios.

BRIEF DESCRIPTION OF THE DRAWINGS

In the following, the present invention will be described in greater detail by way of non-limiting examples with reference to the accompanying drawings.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to ETSI Network Functions Virtualization (NFV) specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

In particular, the present invention and its embodiments may be applicable in any network compound in which virtual network functions are utilized and managed.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) conflict resolution in network virtualization scenarios.

Figure 1:
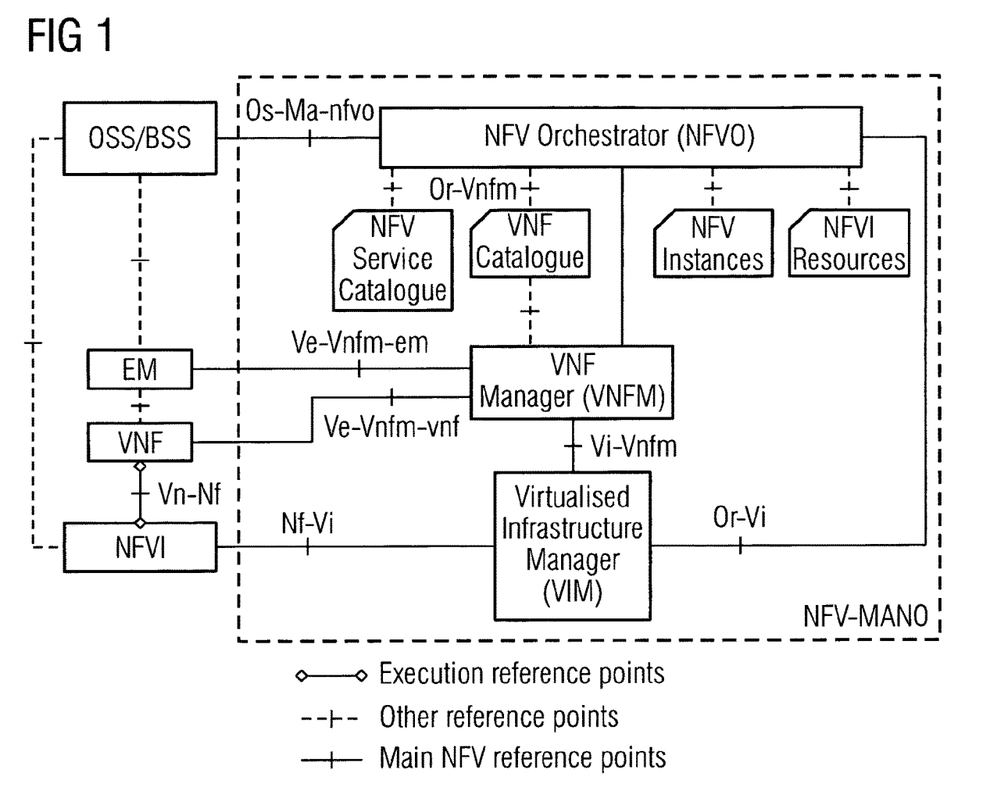
FIG. 1 is a depiction of the NFV concept as defined by ETSI.

FIG. 1 shows the NFV concept as defined by ETSI. A virtual network function (VNF) is managed by the virtual network function manager (VNFM). A virtualized network service (NS) is managed by the network function virtualization orchestrator (NFVO).

Further components are OSS (operations support system), BSS (business support system), NFVI (network function virtualization infrastructure), VIM (virtualized infrastructure manager) and element management (EM).

Further, as can be seen from FIG. 1, certain components are defined as part of the NFV-MANO (Management & Orchestration). In-between all components certain interfaces are defined.

There are certain types of VNFs that may be shared between different network services. An example of such VNF can be a virtualized HSS. In this case only one instance of a virtualized HSS is instantiated and this single VNF instance is then shared among multiple (instances of) network services. The invention addresses the problems that arise when an NFVO decides to initiate a VNF LCM ("Life Cycle Management") operation for a shared VNF. A VNF LCM operation can, for example, be a request to scale the VNF instance (e.g. perform "scale the VNF with external topology scale" operation).

Figure 2:
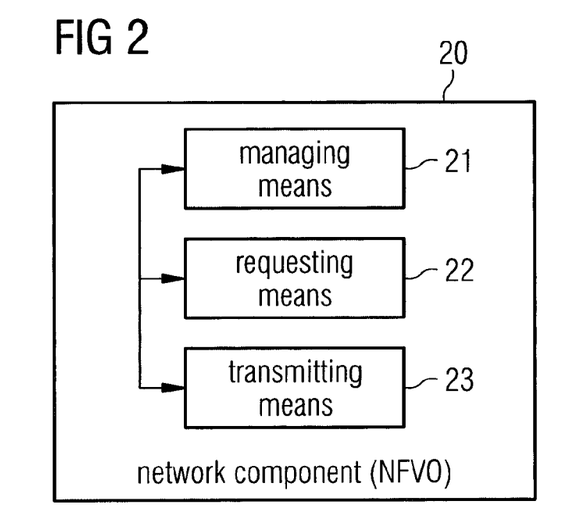
FIG. 2 is a block diagram illustrating an apparatus according to exemplary embodiments of the present invention.

FIG. 2 is a block diagram illustrating an apparatus in a network virtualization scenario used for conflict resolution according to exemplary embodiments of the present invention. The apparatus may be a network entity 20 such as a NFVO comprising a managing means 21, a requesting means 22 and a transmitting means 23. The managing means 21 may manages a network service. The requesting means 12 may request an alteration of a VNF (that is utilized by the network service). The transmitting means transmits information indicative of the planned alteration to a further network component.

Figure 3:
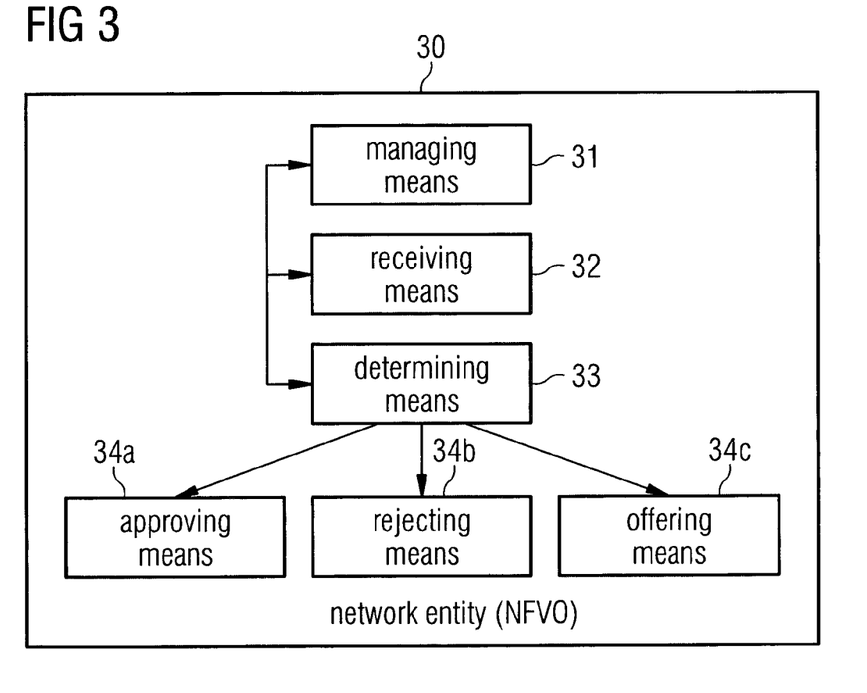
FIG. 3 is a block diagram illustrating an apparatus according to exemplary embodiments of the present invention.

FIG. 3 is a block diagram illustrating an apparatus in a network virtualization scenario for determining on impacts of a planned VNF alteration on network services. The apparatus may also react accordingly, depending on the determination result. The apparatus may be a network entity 30 such as a NFVO comprising a managing means 31, a receiving means 32, a determining means 33 and at least one of an approving means 34a, a rejecting means 34b and an offering means 34c.

The managing means 31 may manage a network service. The receiving means may receive information on a planned alteration of a VNF. The determining means 33 may determine when/if the planned alteration of a VNF will affect (have impact on) the network service. The approving means 34a may approve the planned alteration if no (negative) impact is determined, the rejecting means 34b may reject the planned alteration if a (negative) impact is determined, the offering means 34c may offer an amended alteration if a (negative) impact is determined.

In an embodiment at least some of the functionalities of the apparatus shown in FIG. 2 and/or of the apparatus shown in FIG. 3 may be incorporated in one single operational entity. For example, one NFVO may comprise the apparatus of FIG. 2 and the apparatus of FIG. 3. In other words one first network component (or task) managing a first network service and one second network component (or task) managing a second network service may indeed be handled by the same NFVO.

Therefore, the apparatuses may be seen to depict operational entities comprised in one or more physical or logical devices designed to execute at least some of the described processes.

Figure 4:
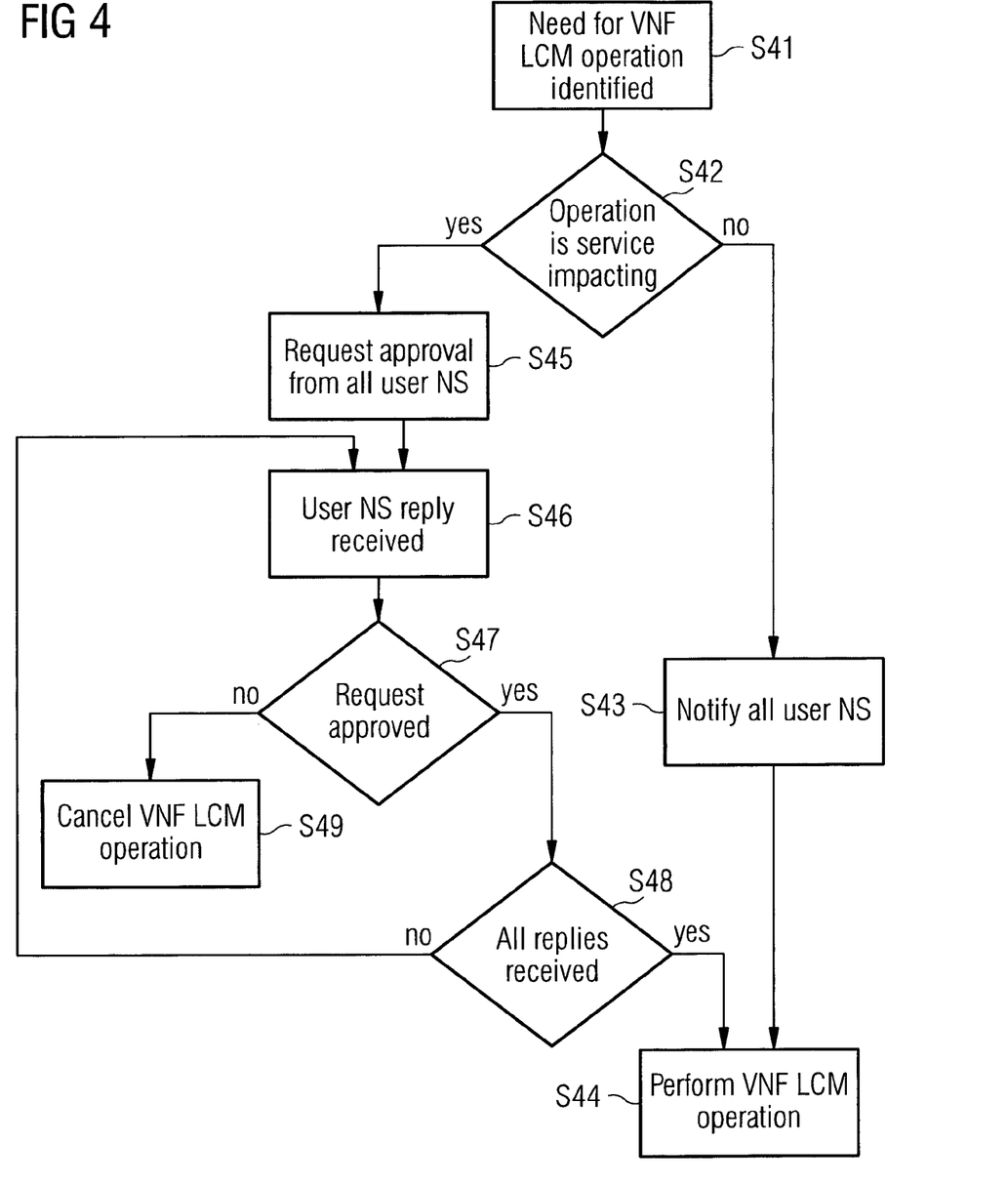
FIG. 4 is a schematic diagram of a procedure according to exemplary embodiments of the present invention.

FIG. 4 is a schematic diagram of a procedure according to exemplary embodiments of the present invention. The procedure could be used when a VNF is shared by multiple network services. Every network service (NS) utilizing the shared VNF may be called a "user NS".

The procedure according to FIG. 4 comprises an operation of identifying (S41) a need for a VNF LCM operation, e.g. based on a management decision with respect to a first (virtualized) network service. An LCM operation may be an alteration of a VNF that may be initiated by a first NFVO.

Optionally, in S42 a basic determination whether or not the LCM operation is impacting a further (virtualized) network service is performed. In case it is determined that the LCM operation is not impacting a further network service, a notification of the LCM operation could be forwarded to all further user NS, for information purposes, for example (S43). Subsequently, the LCP operation may be performed as planned in S44.

In case it is determined in step S42 that the planned LCM operation is impacting a further network service, approval from all further user NS may be requested (S45) (or, respectively, from their NFVOs).

Note again that the basic determination in S42 is optional. The determination with respect to an impact on further user NS could be performed as follows. Each VNF LCM operation may be classified as "service impacting" or "non-service impacting". For example, a VNF instantiation may be defined as a non-service impacting operation (as there is no negative effect on any other NSs, as a new instance is not utilized by any further NS yet—the new VNF "is not a member of any further NS"). Accordingly, a VNF scale-out or scale-up operation may be also be considered as non-service impacting. In contrast, "terminate VNF" operations or scale-down/scale-in operations may be defined as service impacting, for example. Thus, the basic determination may be based on a suchlike classification. However, it is also possible that no basic determination is performed—in this case all LCM operations are handled as explained in the following, for example.

Back to FIG. 4, in step S45 the request for approval from all further NS is initiated. This may be done by transmitting information indicative on the planned LCM operation to all further (user) NS. The NFVOs responsible for management of the further NSs may determine the potential impact on the respective NS and either approve or reject the request for the LCM operation. In an embodiment the respective NFVO may also—in case negative impact on its NS are determined—offer or suggest a different LCM operation better suited for its own NS.

In step S46 of FIG. 4 the respective reply from the further NFVO is received. If the LCM operation is approved (S47), it is checked whether approval from all user NS (S48) is received. If this is the case the VNF LCM operation can be performed (S44). If this is not the case reply from all further user NS is still to be received (back to S46).

If, in step S47 a request is not approved (e.g. if it is rejected by a further NFVO), the planned LCM operation is cancelled in step S49.

Basically, FIG. 4 depicts an example of the communication between the NS (or, respectively the NFVO managing the NS) initiating the VNF LCM operation (prior to the VNF LCM execution) and all other "user NS" sharing the same VNF instance. For non-service impacting VNF LCM operations, the communication may just be a one way notification. In contrast, for service impacting operations, a two way communication is preferred. In this case it could be advantageous to inform any user NS about the planned operation and let the user NS confirm (or reject) the planned VNF LCM operation. In practical terms, the communication between multiple NS implies communication between NFVOs managing the corresponding NS. In cases where both NS are managed by the same NFVO—communication within the NFVO may be necessary. (Note that the term communication may here include—but is not limited to—the following: inter-process communication, setting attributes of objects corresponding to the NS and VNF instances, etc.).

A further NFVO managing a user NS that is informed by a first NFVO planning an LCM operation may—upon receiving information indicative of the planned LCM operation—react as follows. The further NFVO may determine whether (and which) impacts the planned LCM operation may have on its NS. Depending on the determination result the further NFVO may either approve or reject the planned LCM operation or it may offer a different (amended) LCM operation. This different LCM operation may be offered (suggested) to the NFVO that initiated the original LCM operation. This NFVO, in turn, may now approve or reject the amended LCM operation. Again, it is possible that a further change to the LCM operation is defined and the changed LCM operation is again forwarded to the further NFVO for approval. Thus, even a negotiation in-between all involved NFVOs is in the scope of the present invention.

In an embodiment of the invention the further NFVO (or further user NS) may react in response to the request of preforming the planned LCM operations on the shared VNF as follows. If the user NS determine that there is no negative impact from the planned operation, it may just acknowledge the planned operation (i.e. express permission to continue). If the user NS identifies negative impacts (to itself) at least the following options are possible: reject the planned VNF LCM operation or perform internal remedial actions prior to the planned operation execution. This means in certain cases it may be possible to instantiate a "local" instance of a VNF (a substitute VNF) or inform the requesting NS about additional constraints within the local NS.

Figure 5:
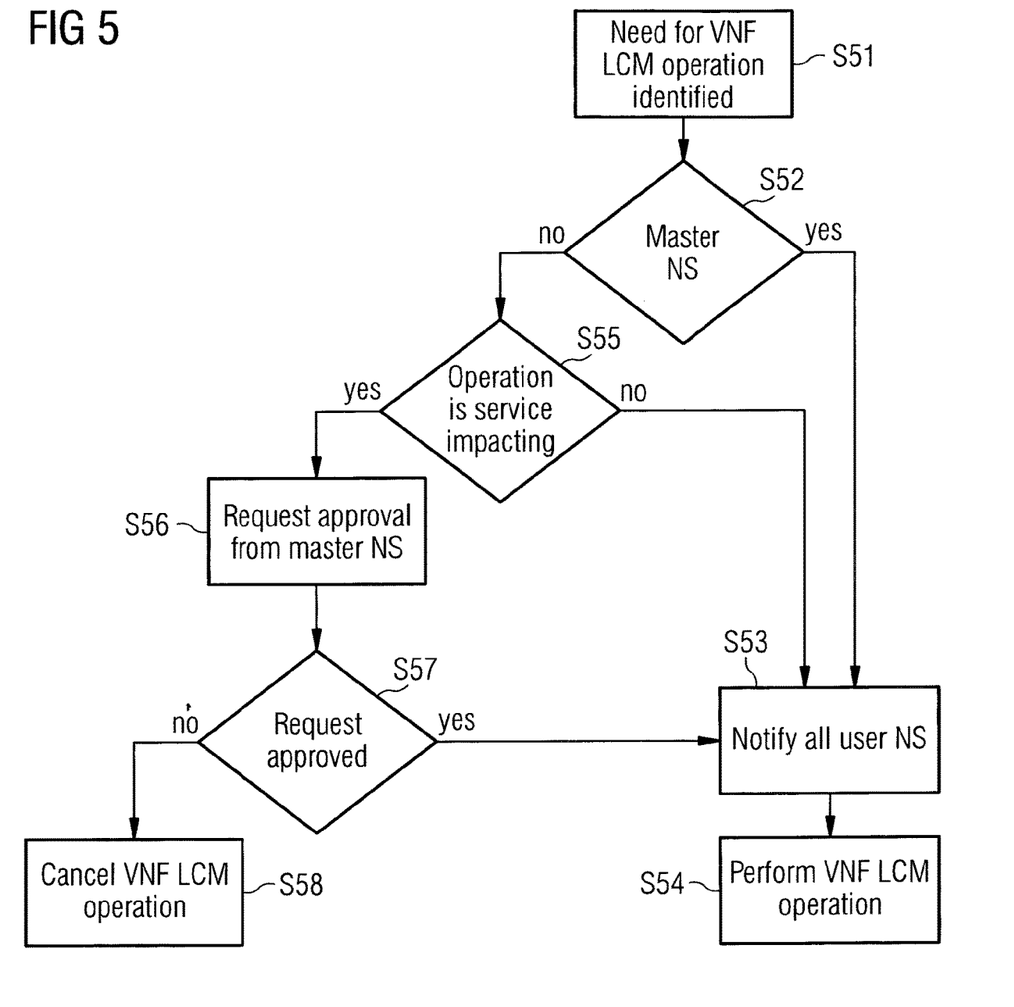
FIG. 5 is a schematic diagram of a procedure according to exemplary embodiments of the present invention.

FIG. 5 is a schematic diagram of a procedure according to exemplary embodiments of the present invention. In this embodiment one network service (or, respectively, the NFVO managing the network service) may be (pre-)determined as "master NS" or "master NFVO". Only if the master NS approves a planned LCM operation the LCM operation will indeed be performed.

The procedure of FIG. 5 comprises in S51 identifying the need for VNF LCM operation. In this case the LCM operation may be initiated/requested. In S52 it is determined whether or not the request for the LCM operation stems from the master NS. If the requests stems from the designated master NS all further user NS are notified about the LCM operation (S53) and the LCM operation is subsequently performed in step S54.

If in S52 it is determined that the request for the LCM operation does not stem from the master NS, it is—optionally, see above step S42—determined whether or not the planned LCM operation is service-impacting (S55). If this is not the case all further user NS are notified about the LCM operation (S53) and the LCM operation is performed (S54). If the planned operation is determined to be service-impacting in S55 approval from the master NS is requested in step S56. This could be done by transmitting information indicative of the planned LCM operation to the master NS. When a reply is received from the master NS it is determined whether or not the LCM operation is approved (S57). If it is approved all further user NS are notified accordingly (S53) and the LCM operation is performed (S54). If it is determined that the request is not approved by the master NS in S57 the planned LCM operation is cancelled (S58).

It is to be noted that, similarly to the procedure explained above with respect to FIG. 4, the NS responsible for approval (here: the master NS) may approve or reject the planned LCM operation or offer an amended LCM operation. In an embodiment the master NS may determine a different LCM operation and directly perform this different LCM operation.

The procedure according to FIG. 5 explains an embodiment where also a conflict between multiple (potentially conflicting) VNF LCM operations performed in the interests of a plurality of user NS can be resolved. This can be achieved by defining different priorities for each user NS. In the case above one NS having the highest priority ("master NS") may be responsible for conflict resolutions.

In such embodiments communication as explained above is still applicable—one way communication towards "normal" user NS (having the same priority) and two-way communication to (and from) "master NS". (In other words, only the master NS may approve/reject the planned LCM operation request).

In another embodiment prioritization is not done at the NS level, but at the NFVO level (i.e. all NSs managed by NFVO1 have a higher priority than those managed by NFVO2, for example)—this may be useful e.g. when one of the NFVOs is responsible for security aspects. This NFVO may have the highest priority.

Figure 6:
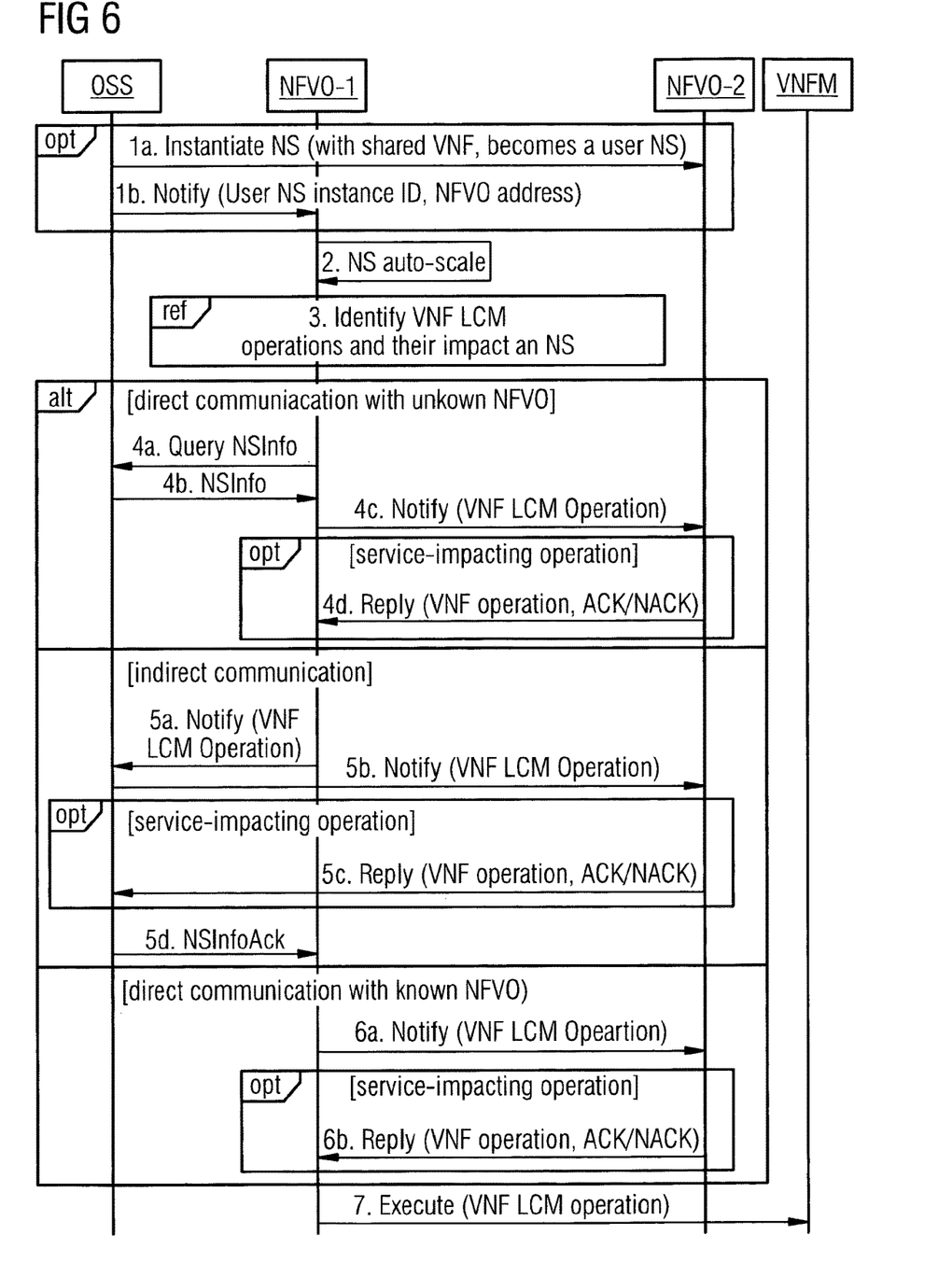
FIG. 6 shows a schematic diagram of an example of a system environment with signaling variants according to exemplary embodiments of the present invention.

FIG. 6 shows a schematic diagram of an example of a system environment with signaling variants according to exemplary embodiments of the present invention.

The sequence diagram of FIG. 6 implies that there is at least one VNF instance shared between two NS instances NFVO-1 and NFVO-2. NFVO-1 manages a first NS instance and NFVO-2 manages a second NS instance.

The first optional interaction (step 1a) illustrates a situation where a VNF instance being part of a "first" NS instance managed by NFVO-1 is being "shared" (i.e. it is about to become part of a "second" NS instance instantiated by NFVO-2 on the request of the OSS). By instantiating the second NS which utilizes the VNF the second NS is a "user NS" as explained above.

The second optional interaction (step 1b) shows a notification from OSS to the NFVO-1 informing it that some of the VNFs of "first" NS instance are now shared by the "second" NS instance managed by NFVO-2.

A VNF LCM operation can be triggered in the NFVO-1, e.g. by an NS auto-scale function (step 2). The NFVO-1 may determine (step 3) whether or not the VNF LCM operation is service impacting according to the basic determination described above.

Subsequently, NFVO-1 that is initiating the VNF LCM operation on the shared VNF needs to inform all user NSs (further NFVOs) that are using the same shared VNF about the planned LCM operation.

For this NFVO-1 needs to find out the user NS and the NFVO(s) managing these user NS. This may be done by sending a query to the OSS.

In FIG. 6 three methods of how to inform the further NFVOs that are managing the user NS that are using the same shared VNFs are shown. Of course, also a combination of these methods may be performed.

According to the first method (see steps 4a, 4b, 4c and 4d) the OSS forwards the NFVO addresses of the NFVOs that are managing the requested NS. The NFVO will then send the notification about the planned VNF LCM operation to the respective further NFVO(s).

In the second method (see steps 5a, 5b, 5c and 5d) the OSS informs the further NFVOs about the planned VNF LCM operation. In this case the NFVO that is sending the query about the "secondary" NSs needs to also transmit information indicative of the planned VNF LCM operation to the OSS. The OSS may acknowledge the query to the NFVO and indicate that the further NFVOs have been informed.

According to the third method (see steps 6a and 6b) the user NS and user NFVO(s) managing the user NS(s) are already known to the master NS via a notification (see step 1b) when the user NS is instantiated.

Finally, NFVO-1 may execute the planned VNF LCM operation towards the VNFM (step 7).

In case a master NS (or master NFVO) is defined as explained above an exemplary procedure according to the present invention may be as follows.

If the VNF LCM operation is a service-impacting, e.g. a scale-in or scale-down, then the NFVO managing the master NS needs to get confirmation from all user NSs. For this the same mechanism for NFVO discovery for user NSs could be used. To get confirmation from all user NSs there are at least the following three options in the scope of the present invention that may also be combined.

According to the first option the OSS sends the NFVO address(es) to the NFVO managing the master NS. The master NFVO then sends an approval request to the further NFVO(s) managing the user NS. These further NFVO(s) can respond to the NFVO managing the master NS. (See steps 4a, 4b, 4c and 4d.)

In the second option the OSS manages the collection of the approval requests from the NFVO(s) managing the user NS. Addressed by steps. (See 5a, 5b, 5c and 5d.)

According to the third option (see steps 6a and 6b) the user NS and user NFVO(s) managing the user NS(s) are already known to the master NS via a notification (see step 1b) when the user NS is instantiated. The NFVO then sends the approval request to the further NFVOs managing the user NS and these further NFVO(s) may respond to the NFVO managing the master NS.

In FIG. 6, also potential behavior of the user NS (or, respectively, the NFVO managing the user NS) is shown.

For service impacting operations the further NFVO(s) may reply by either acknowledging (approving) or rejecting the planned VNF LCM operation (see step 4d, step 5d or step 6b). In certain embodiments the reply may include a suggested alternative VNF LCM operation that may be offered. As an example, when initially a scale-down from 100 to 50 was requested an amended scale-down from 100 to 80 could be proposed.

In any case, once the NFVO managing the master NS gets the approval from all user NSs it may continue its process by executing the planned VNF LCM operation (see step 7).

Figure 7:
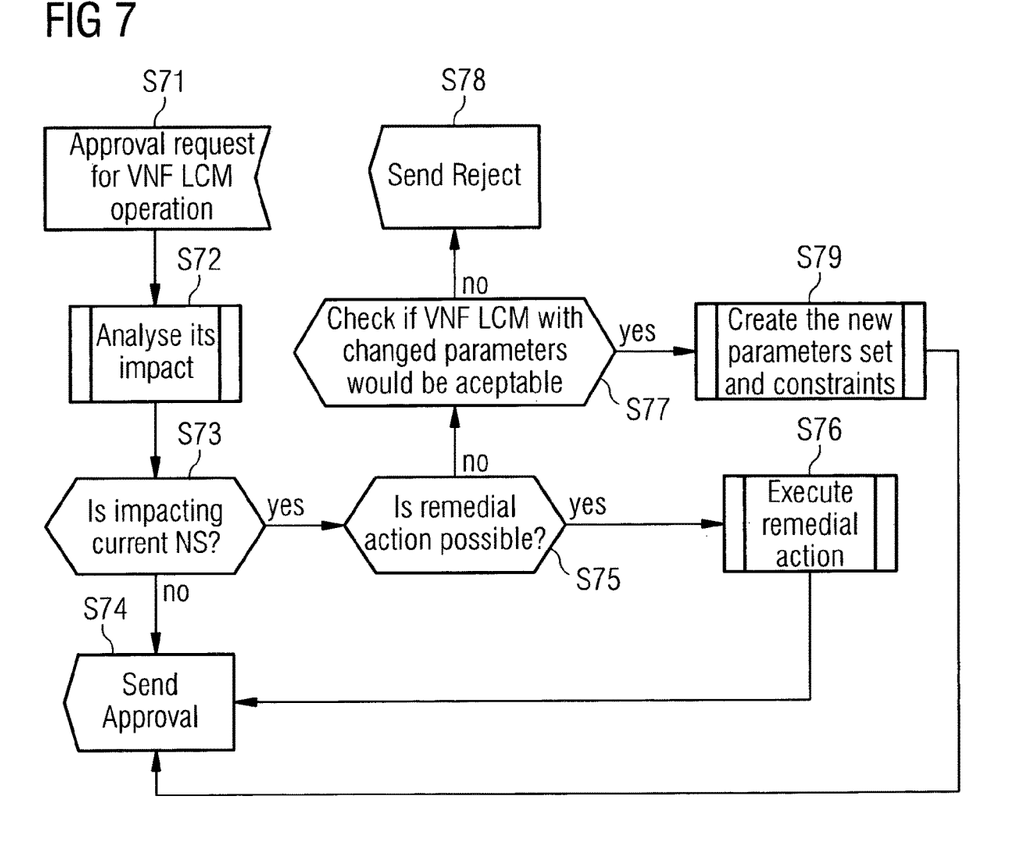
FIG. 7 is a schematic diagram of a procedure according to exemplary embodiments of the present invention.

FIG. 7 shows a schematic diagram of a procedure according to exemplary embodiments of the present invention. This procedure may be performed by a user NS (or, respectively, an NFVO managing a user NS) when it is informed about a planned LCM operation.

After receiving an approval request for a planned LCM operation in (S71) an analyzation of the impact of this planned LCM operation can be performed (S72).

Relying on information indicative of the planned LCM operation that has been received impact on the current user NS may be determined (S73).

If no impact can be determined an approval of the planned LCM operation is sent (S74). If, in S73 an impact is determined it is determined whether or not a remedial action is possible (S75).

If a remedial action is possible, this remedial action is executed (S76) and an approval of the planned LCM operation is sent (S74). If no remedial action is possible it is checked in S77 if an LCM operation with changed parameters would be acceptable. In other words, an amended LCM operation suitable for the current user NS (e.g. without negative effect) is searched.

If an acceptable different LCM operation is not found a rejection to the originally planned LCM operation is sent (S78). If an acceptable different LCM operation is found in S77 new parameter sets and constraints (for the different LCM operation) are created in S79 and an approval (including the new parameter sets and constraints) is sent (S74).

In the foregoing exemplary description of the network entities or network components, only the units that are relevant for understanding the principles of the invention have been described using functional blocks. The network entities may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity or component (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
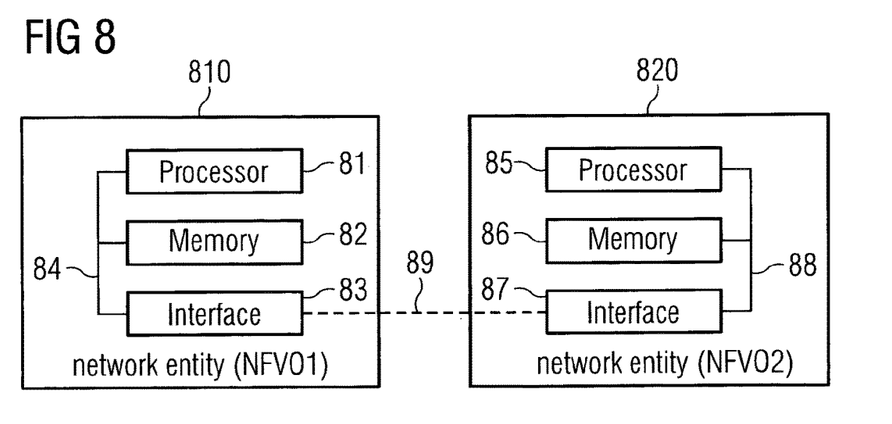
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (network entity 810) (e.g. corresponding to the network entity 20) comprises a processor 81, a memory 82 and an interface 83, which are connected by a bus 84 or the like. Further, according to exemplary embodiments of the present invention, the apparatus (network entity 820) (corresponding to the network entity 30) comprises a processor 85, a memory 86 and an interface 87, which are connected by a bus 88 or the like, and the apparatuses may be connected via link 89, respectively. Connected via link 69, the apparatuses 810 and 820 may form a system having, in particular, two independent NFVO(s).

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

While according to the embodiments depicted in FIG. 8 the apparatus corresponding to the network entity 20 and the apparatus corresponding to the network entity 30 are implemented by means of separate processors, memories, and interfaces, according to exemplary embodiments of the present invention, the apparatus corresponding to the network entity 20 and the apparatus corresponding to the network entity 30 may share at least one of processor and the memory. In such case, an interface between these two apparatuses may be suitably implemented.

The memory 82/86 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network entity 20 comprises at least one processor 81, at least one memory 82 including computer program code, and at least one interface 83 configured for communication with at least another apparatus. The processor (i.e. the at least one processor 81, with the at least one memory 82 and the computer program code) is configured to perform managing a virtualized network service utilizing a virtualized network function, requesting an alteration of the virtualized network function, and transmitting information indicative of the alteration of the virtualized network function to a further apparatus managing a further virtualized network service utilizing the virtualized network function.

According to further exemplary embodiments of the present invention, an apparatus representing the network entity 30 comprises at least one processor 85, at least one memory 86 including computer program code, and at least one interface 87 configured for communication with at least another apparatus. The processor (i.e. the at least one processor 85, with the at least one memory 86 and the computer program code) is configured to perform managing a virtualized network service utilizing a virtualized network function, receiving information indicative of a planned alteration of the virtualized network function from a further apparatus managing a further virtualized network service utilizing the virtualized network function, determining when the alteration of the virtualized network function impacts the virtualized network service, and at least one of the following: approving the alteration of the virtualized network function as function of the determining when the alteration of the virtualized network function impacts the virtualized network service, rejecting the alteration of the virtualized network function as function of the determining when the alteration of the virtualized network function impacts the virtualized network service, offering an alternative alteration of the virtualized network function as function of the determining when the alteration of the virtualized network function impacts the virtualized network service.

For further details regarding the operability/functionality of the individual apparatuses, reference is made to the above description in connection with the Figures.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
AZ availability zone
EM element manager
ETSI European Telecommunications Standards Institute
IaaS Infrastructures as a Service
LCM lifecycle management
NFV network functions virtualization
NFVI network function virtualization infrastructure
NFVO NFV orchestrator
NS Network service
VIM virtualized infrastructure manager
VM virtual machine
VNF virtualized network function
VNFC VNF component
VNFD VNF descriptor
VNFM VNF manager

The invention claimed is:

1. A method in a network virtualization scenario, wherein a virtualized network function is utilized by a first virtualized network service managed by a first network function virtualization orchestrator and a second virtualized network service managed by a second network function virtualization orchestrator, comprising:

requesting, by the first network function virtualization orchestrator, an alteration of the virtualized network function, transmitting, by the first network function virtualization orchestrator, information indicative of the alteration of the virtualized network function to the second network function virtualization orchestrator, determining, by the second network function virtualization orchestrator, when the alteration of the virtualized network function impacts the second virtualized network service based upon utilization of at least one additional virtualized network function by at least one additional virtualized network service, the determining step further comprising at least one of the following:

in response to approving the alteration of the virtualized network function, triggering the first network function virtualization orchestrator to implement the alteration by scaling the virtualized network function, in response to offering an alternative alteration of the virtualized network function, triggering the first network function virtualization orchestrator to implement the alternative alteration by scaling the virtualized network function.

2. The method according to claim 1, wherein the determining when the alteration of the virtualized network function impacts the second virtualized network service is performed by the second network function virtualization orchestrator.

3. The method according to claim 1, wherein the determining when the alteration of the virtualized network function impacts the second virtualized network service is performed by the first network function virtualization orchestrator and, when it is determined that the alteration of the virtualized network function impacts the second virtualized network service, no information is transmitted and the alteration of the virtualized network function is rejected.

4. The method according to claim 1, further comprising retrieving information indicative of the second network function virtualization orchestrator from an operations support system.

5. A system in a network virtualization scenario, comprising:
  a first network function virtualization orchestrator comprising at least one first processor,
  a first network service managed by the first network function virtualization orchestrator,
  a second network function virtualization orchestrator comprising at least one second processor,
  a second network service managed by the second network function virtualization orchestrator, and
  a virtualized network function utilized by the first virtualized network service and the second virtualized network service,
  wherein
  said first network function virtualization orchestrator is configured to request an alteration of the virtualized network function,
  said first network function virtualization orchestrator is configured to transmit information indicative of the alteration of the virtualized network function to the second network function virtualization orchestrator,
  said second network function virtualization orchestrator is configured to determine when the alteration of the virtualized network function impacts the second virtualized network service based upon utilization of at least one additional virtualized network function by at least one additional virtualized network service, wherein said second network function virtualization orchestrator is further configured to at least one of the following:
  in response to approving the alteration of the virtualized network function, trigger the first network function virtualization orchestrator to implement the alteration by scaling the virtualized network function, and
  in response to offering an alternative alteration of the virtualized network function, trigger the first network function virtualization orchestrator to implement the alternative alteration by scaling the virtualized network function.

6. The system according to claim 5, wherein the second network function virtualization orchestrator is configured to determine when the alteration of the virtualized network function impacts the second virtualized network service.

7. The system according to claim 5, wherein the first network function virtualization orchestrator is configured to determine when the alteration of the virtualized network function impacts the second virtualized network service and, when it is determined that the alteration of the virtualized network function impacts the second virtualized network service, to not transmit information and reject the alteration of the virtualized network function.

8. The system according to claim 5, further comprising an operations support system and wherein said system is configured to retrieve information indicative of the second network function virtualization orchestrator from the operations support system.

* * * * *